UNITED STATES PATENT OFFICE.

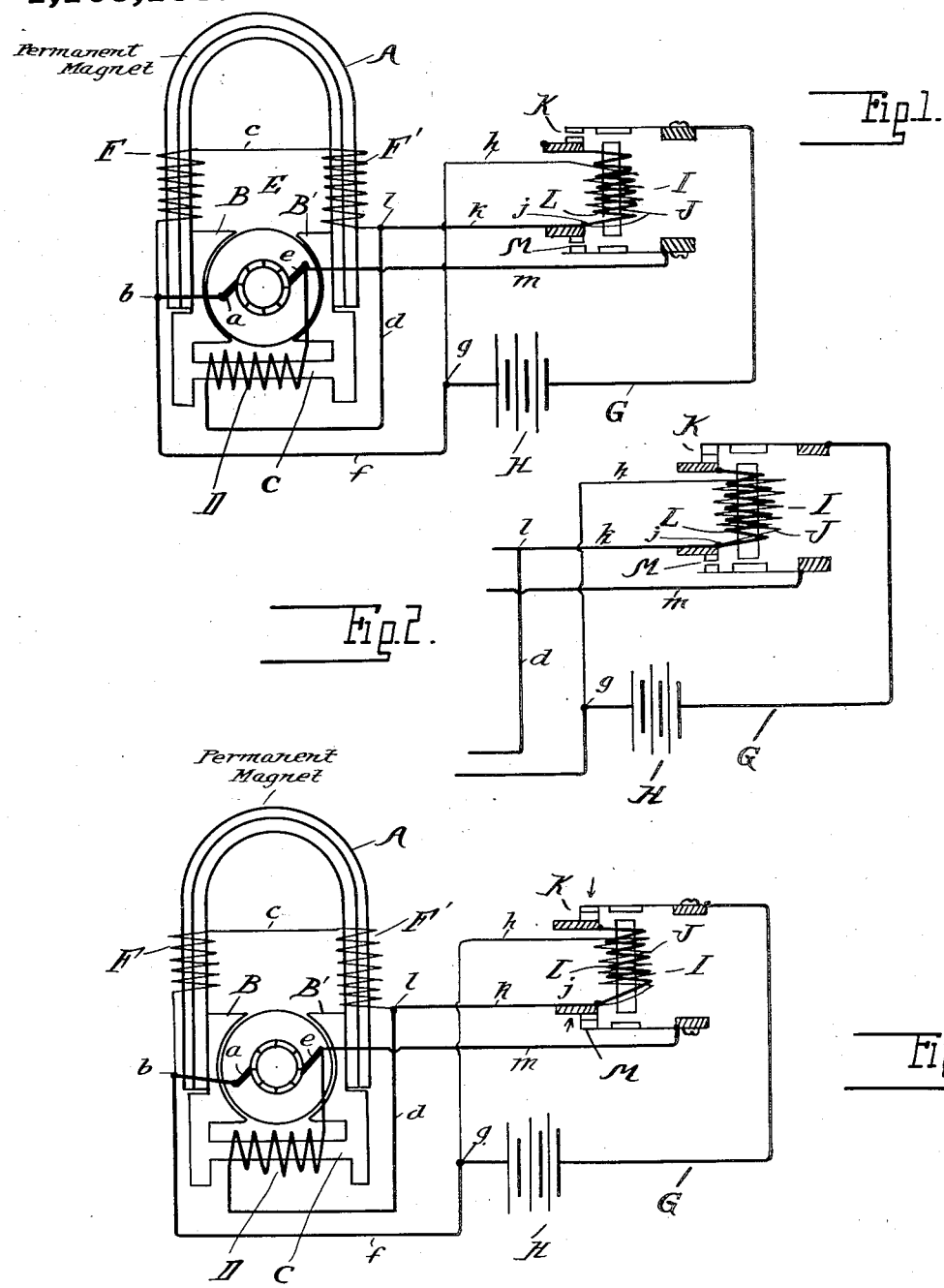

THEODOR M. MUELLER, OF DETROIT, MICHIGAN.

SELF-REGULATING DYNAMO.

1,105,155. Specification of Letters Patent. Patented July 28, 1914.

Application filed May 15, 1913. Serial No. 767,779.

*To all whom it may concern:*

Be it known that I, THEODOR M. MUELLER, a subject of the Emperor of Germany, residing at Detroit, in the county of Wayne and State of Michigan, have invented certain new and useful Improvements in Self-Regulating Dynamos, of which the following is a specification, reference being had therein to the accompanying drawings.

The invention relates to dynamo electric generators particularly designed for use in connection with motor vehicles, for the operation of electric lights, the charging of storage batteries, etc.

It is the object of the present invention to obtain a construction which is self regulating and that is incapable of raising the amperage beyond a predetermined safe limit.

To this end the invention comprises various features of construction as hereinafter set forth.

In the drawings: Figure 1 is a diagram showing the construction and arrangement of circuits in initial position; Fig. 2 is a view similar to a portion of Fig. 1 showing a different adjustment; and Fig. 3 is a similar view showing still another adjustment.

In the construction of my improved dynamo generator it is desirable to obtain a quick starting construction, which is accomplished by the use of a permanent magnet. Inasmuch, however, as the dynamo is driven at varying speeds and it is necessary to limit the voltage and amperage, I have made provision for short circuiting a material part of the lines of force of the permanent magnet whenever the current production exceeds the desired limit. A further function performed by the same means is the operation of the machine as a shunt dynamo until the required voltage is obtained.

In detail, A is a permanent magnet of the usual horseshoe type; B and B' are the segmental pole pieces therefor, preferably formed of soft magnetic metal; and C is a cross connection between said pole pieces, by means of which the lines of force of the permanent magnet may be short circuited or caused to flow from one pole of the permanent magnet to the other pole. Upon this cross connection C is wound a coil D, and coils F and F' are arranged upon the permanent magnet A. These coils F F' and D are initially connected in series with each other and in shunt with the armature E, so that the dynamo in starting operates as a shunt wound machine.

G is the work circuit, including a storage battery H for charging or other work to be performed. This circuit is initially open, but is adapted to be closed when the required voltage is obtained by an electromagnetic controller I, including the coil J. The coil J is initially in series with the coil D and in shunt with the coils F and F'. When the required voltage is obtained, the flow of the current through the coil J will energize the magnet I to close an automatically opening cut-out switch K, which completes the work circuit as shown in Fig. 2, after which the dynamo operates as a compound machine, charging the battery or performing the other work in the circuit G.

As the speed of the armature is variable, it would be possible with the arrangement thus far described for the current generated to exceed the desired limit. Such an effect I have guarded against by including in the controller I a second coil L which is in series with the coil D and the work circuit G. Consequently, whenever the current volume exceeds the predetermined limit, a second normally open switch M will be closed, which switch short circuits the coil D, performing the double function of throwing this coil out of service and permitting a material part of the magnetic lines of force to flow from the pole of the magnet through the cross connection C to the other pole of the magnet, thereby materially decreasing the lines of force of the magnetic field. The result is the instantaneous decrease in current production, which in turn instantaneously affect the controller I to permit the opening of the circuit closer M so that the total effect is to produce a rapid vibration of the circuit closer M, thereby maintaining the current volume at the desired limit without fluctuation either above or below the same.

Referring to the particular construction illustrated in the drawing, in which the work to be performed in the work-circuit is the charging of the battery H, in operation, during the initial starting of the dynamo, the parts are as shown in Fig. 1. Current then flows from the brush $a$ to the point $b$ where it divides, part going through the coil F to the coil F' by way of the connection $c$, then to the conduit $d$, through the coil D to the brush *e*. The remaining part of the current passes from the point *b* by way of the lead *f* to the point *q*, from the latter point through the lead *h* to the coil J, then from the point *j* by way of the conduit or lead *k* to the point *l*. From this point the current passes from the conduit *k*, through the lead *d*, coil D to the brush *e*. Since the switch K is not closed the work-circuit G is open; also the switch M is open. The dynamo therefore, operates as a shunt-wound machine. The coil J is in the magneto circuit and is so constructed as not to close the switch K until a predetermined voltage is obtained, so as to avoid cutting in the battery circuit while the voltage is too low; otherwise there would be a drain upon the battery when the voltage created by the dynamo was less than the voltage of the battery.

With the parts as shown in Fig. 1, the current passing through the coil D acts to depolarize the connection C and thereby oppose the passing of the magnetic lines of force from one pole of the permanent magnet through the connection C to the other pole.

After the predetermined voltage is obtained the coil J acts to close the switch K. The current then passes from the brush *a* to the point *b* by way of the conduit *f* and point *g* through the battery, then to switch K, through coil L, leads *k d* and coil D to brush *e*. Also the current passes from point *b*, through the coils F F' to the point *l*, to lead *d* and from the latter—as before stated—through coil D to brush *e*. When the parts are as shown in Fig. 2, current also passes from the point *g* by way of lead *h*, through the coil J to the point *j*, then by way of leads *k d* through coil D to brush *e*. It will be noted that the coil J is not in the work-circuit but is in parallel with it, while the coil L forms a part of the work-circuit.

When the current production reaches the desired limit, the coil L closes the switch M, the parts then being as shown in Fig. 3. The spring of the switch M is of greater tension than the spring of the switch K and will not be overcome by the magnetic lines of force developed in the coil J alone. With the parts arranged as illustrated in the last-mentioned figure, the current passes from the brush *a* to the point *b*, conduit *f* to the point *g*, through the battery to the switch K and through the coil L to the point *j*. Instead of passing by way of the conduits *k* and *d* to the coil D and then to the brush *e*, the current takes the line of least resistance and passes through the switch M and the conduit *m* to the brush *e*. The current also passes from the point *b*, through the coils F and F', the conduit *k*, switch M, conduit *m* and the brush *e*. From the point *g* the current passes by way of the lead *h* through the coil J, to the point *j*, then through the switch M, the conduit *m* and brush *e*. Thus it will be noted that when the switch M is closed the coil D is short circuited. As soon as the current ceases to flow through the coil D a material part of the lines of magnetic force short circuit from one pole thereof through the connection C to the other pole, which causes a decrease in the current production. This decrease is instantaneous and immediately upon a drop in the current production the switch M opens. Therefore, the effect is to maintain the current volume substantially constant.

By the construction described it will be apparent that during the initial starting of the dynamo generator, it operates as a shunt-wound machine, which is exceedingly desirable, since a shunt-wound machine quickly builds up the voltage. After the predetermined voltage is obtained the dynamo generator automatically becomes a compound wound machine, which type of machine is the most efficient for increasing the current production. However, when the current production reaches the desired limit, the dynamo generator becomes a simple shunt-wound machine having, however, a material part of the lines of force of the permanent magnet short circuited. The latter type of machine—as before stated—materially and instantaneously decreases the current production but builds up the voltage.

It will be understood that the construction as described is absolutely safe guarded against destructive operation, as it is impossible to generate more than the predetermined volume of current, regardless of the speed at which the armature is revolved.

What I claim as my invention is:

1. The combination of a dynamo constructed to initially operate as a shunt-wound machine composed of a field magnet, shunt windings, means for short circuiting a material part of the magnetic lines of force of the field magnet, electrical means opposing the passing of the magnetic lines of force through said short circuiting means, and an open work-circuit, means for automatically closing the work-circuit and placing said electrical means in the work-circuit to change the dynamo to a compound wound machine when a predetermined voltage is obtained, and means for automatically short circuiting said electrical means and changing said dynamo to a shunt-wound machine when the current production exceeds a predetermined limit.

2. The combination of a dynamo constructed to initially operate as a shunt-wound machine composed of a field magnet, shunt windings, means for short circuiting a material part of the magnetic lines of force of the field magnet, electrical means opposing the passing of the magnetic lines of force through said short circuiting means, and an open work-circuit, means for automatically closing the work-circuit and placing said electrical means in the work-circuit to change the dynamo to a compound wound machine when a predetermined voltage is obtained, and means for automatically short circuiting said electrical means and changing said dynamo to a shunt-wound machine when the current production exceeds a predetermined limit and for instantaneously reëstablishing said electrical means in the work-circuit upon the falling of the current production below said predetermined limit.

3. The combination of a dynamo composed of a field magnet, shunt windings, a connection between the poles of the field magnet for short circuiting a material part of the magnetic lines of force of the field magnet, a coil upon said connection initially in series with the shunt windings whereby said dynamo operates as a shunt machine, said coil when energized generating magnetic lines of force opposing the short circuiting of the magnetic lines of force of the field magnet through said connection and a normally open work-circuit, means automatically operating when a predetermined voltage is obtained for closing said work-circuit and placing said coil in the work-circuit to change said dynamo to a compound wound machine when a predetermined voltage is obtained, and means for automatically short circuiting said coil and changing said dynamo to a shunt-wound machine when the current production exceeds a predetermined limit, and for reestablishing said coil in the work-circuit upon the falling of the current production below said predetermined limit.

4. The combination of a dynamo constructed to initially operate as a shunt-wound machine, means for automatically changing said dynamo to a compound wound machine when a predetermined voltage is reached, means for changing said dynamo to a shunt-wound machine when the current production exceeds a predetermined limit and for instantaneously reëstablishing said dynamo as a compound wound machine upon the falling of the current production below said predetermined limit.

In testimony whereof I affix my signature in presence of two witnesses.

THEODOR M. MUELLER.

Witnesses:
   JAMES P. BARRY,
   DELBERT COLLINS.